United States Patent [19]

Hamilton, Jr. David M.

[11] Patent Number: 5,401,485
[45] Date of Patent: Mar. 28, 1995

[54] REDUCTION OF RESIDUAL CHLORIDE IN IRON OXIDES

[75] Inventor: Hamilton, Jr. David M., Houston, Tex.

[73] Assignee: Shell Oil Company, Houston, Tex.

[21] Appl. No.: 213,344

[22] Filed: Mar. 15, 1994

[51] Int. Cl.$^6$ .............................................. C01G 49/02
[52] U.S. Cl. ............................ 423/632; 423/DIG. 1; 423/633; 423/634; 423/150.1
[58] Field of Search ............... 423/632, 633, 634, 146, 423/DIG. 1, 150.1; 106/456

[56] References Cited

U.S. PATENT DOCUMENTS

| | | | |
|---|---|---|---|
| 495,197 | 4/1893 | Fronheiser | 423/138 |
| 887,042 | 5/1908 | Heckman | 106/456 |
| 1,837,709 | 12/1931 | Heckman | 106/456 |
| 2,105,670 | 1/1938 | Perkins | 106/456 |
| 3,635,664 | 1/1972 | Morimoto | 423/146 |
| 4,092,401 | 5/1978 | Dreulle | 423/166 |
| 4,219,354 | 8/1980 | Rastas et al. | 423/146 |
| 4,289,746 | 9/1981 | Hayakawa et al. | 423/633 |
| 4,355,005 | 10/1982 | Rastas et al. | 423/146 |
| 4,452,762 | 6/1984 | Fugleberg et al. | 423/1 |
| 4,565,675 | 1/1986 | Uchino et al. | 423/140 |
| 4,701,221 | 10/1987 | Brunn et al. | 423/633 |
| 4,935,219 | 6/1990 | Escolar et al. | 423/633 |
| 5,190,906 | 3/1993 | Murakami et al. | 502/304 |

FOREIGN PATENT DOCUMENTS

| | | | |
|---|---|---|---|
| 59-50031 | 9/1982 | Japan | |
| 59-050028 | 3/1984 | Japan | |
| 61-146719 | 7/1986 | Japan | 423/632 |
| 63-112425 | 5/1988 | Japan | 423/632 |
| 63-222019 | 9/1988 | Japan | 423/634 |
| 1192730 | 8/1989 | Japan | 423/632 |
| 3-131524 | 6/1991 | Japan | 423/632 |

OTHER PUBLICATIONS

Removal of Chloride Ions from Hematite Powders for Ferrite Production, K. Suganuma, T. Obi, and G. Furusho, 4th International Conference in Ferrites, Part I. Advanced in Ceramics, vol. 15 pp. 81–85, no date.

*Primary Examiner*—Steven Bos
*Attorney, Agent, or Firm*—Y. Grace Tsang

[57] ABSTRACT

A process for reducing the residual chloride present in iron oxides, particularly in regenerated iron oxides produced from hydrochloric acid waste liquid generated from steel pickling, by post-synthesis treatment of the iron oxides with sulfuric acid optionally followed by drying and calcining. The purified regenerated iron oxides are particular suitable for making iron oxide based catalysts such as ethylbenzene dehydrogenation catalysts and high-grade ferrites.

19 Claims, No Drawings

REDUCTION OF RESIDUAL CHLORIDE IN IRON OXIDES

FIELD OF THE INVENTION

This invention relates to a process for the reduction of residual chloride present in regenerated iron oxides by treating the iron oxides with sulfuric acid followed by drying and calcining.

BACKGROUND OF THE INVENTION

During the last twenty years, the regenerated iron oxides (RIO) produced from hydrochloric acid waste liquid generated from steel pickling have been recognized as an important source of raw material for preparing products containing iron oxides such as iron-oxide based catalysts and high-grade ferrites. The raw material cost savings associated with the substitution of a low cost, regenerated iron oxide for most of the conventional commercial sources of iron oxides are substantial.

One drawback of utilizing regenerated iron oxides from hydrochloric acid waste liquids generated from steel pickling is that the ferric oxides inevitably contain chloride ions, typically in the range of about 0.1 to 0.5% measured as grams of chloride per 100 grams of regenerated iron oxide. In the field of ethylbenzene dehydrogenation catalysts, it is known that the small amounts of residual chloride present in all regenerated iron oxides affect catalyst performance adversely. For the ferrite producers, the chloride ion present in the regenerated iron oxide is not only corrosive to the ferrite manufacturing installations but also injurious to the quality of the ferrite produced.

Reducing the chloride-ion content in regenerated ion oxides by an economical procedure, without significantly changing the ferric oxide quality is believed to be one of the most critical issues for the development of regenerated iron oxides as commercially useful raw materials.

Japanese patent application J59,050,031, published Sep. 13, 1992, discloses a method for purifying iron oxide from waste hydrochloric acid pickling solution containing ferric chloride by treatment with ferrous sulfate, ferric sulfate or ammonium sulfate solution. The iron oxide purified by this prior art method still contains a substantial amount of chloride. Moreover, it is time consuming to dissolve these salts in water. Furthermore, the raw material costs for these sulfate salts are relatively high.

Suganuma, et al. in 4th International Conference on Ferrites, *Advances in ceramics*, vol. 15, 81-85 (1986), reported a method for removing chloride ions from hematite powders by heating the ferric oxide in air with the addition of sulfur dioxide and/or moisture. However, sulfur oxide is a toxic gas which is unhealthy and environmentally undesirable.

Thus, there remains a need for a commercial process which will substantially reduce the chloride contents in regenerated iron oxides (RIO) at a low cost without significantly changing the quality of the iron oxides.

SUMMARY OF THE INVENTION

The present invention relates to a process for reducing the residual chloride present in iron oxides, particularly in regenerated iron oxides (RIO) produced from hydrochloric acid waste liquids generated from steel pickling, by post-synthesis treatment of the iron oxides with sulfuric acid, optionally followed by drying and calcining. The purified regenerated iron oxides are particular suitable for making iron oxide-based catalysts such as ethylbenzene dehydrogenation catalyst and high-grade ferrites.

DESCRIPTION OF THE EMBODIMENTS

The iron oxides to be treated by the process of the present invention in its broadest aspect are selected from any iron oxides of mineral or synthetic origin which contain either trace or substantial amounts of chloride. Various methods for the obtaining of iron oxides from scrap steel, steel scaling liquors, or iron chloride as industrial waste product have been described in U.S. Pat. No. 4,935,219. The iron oxides obtained from some of these methods inevitably contain residual chlorides originating from the chloride-containing reagents or raw materials present during the process of generating the iron oxides.

As a preferred embodiment, the iron oxides treated in the instant invention are the regenerated iron oxides (RIO) produced from hydrochloric acid waste liquids generated from steel pickling. During the process of producing the regenerated iron oxides, hydrochloric acid pickling wastes are sprayed into a roaster, whereby water and free HCl in the wastes are driven off quickly, while $FeCl_2$ is hydrolyzed to produce iron oxide and hydrogen chloride. The regenerated iron oxides contain chloride ions, typically in the range of from about 800 parts per million to about 20,000 parts per million, particulary in the range of from about 800 to 5,000 parts per million, by weight of the regenerated iron oxides.

The sulfuric acid used in treating iron oxides in the instant invention can be any commercial or reagent grade sulfuric acid. Preferably, concentrated sulfuric acid is diluted with water, more preferably with deionized water or distilled water, before being used as the reagent for treating iron oxides. In a specific embodiment of the present invention, concentrated sulfuric acid with specific gravity of about 1.84 g/ml is diluted with about ten times to 100 times by volume of deionized water prior to being used for treating the iron oxide.

The molar amount of sulfuric acid in the sulfuric acid solution used for treating iron oxides is generally a molar amount of from about 0.5 to 10, preferably from about 1.0 to about 5.0, more preferably from about 1.8 to about 2.5, still more preferably about 2.0 times the total molar amount of chloride present in the iron oxides to be treated.

The iron oxides may be treated with a sulfuric acid solution by any method known to one skilled in the art which would achieve thorough mixing of the iron oxides with the sulfuric acid solution. As a non-limiting example, the iron oxides may be slurried with the sulfuric solution followed by either decantation or filtering. As another non-limiting example, the iron oxides may also be wetted with the sulfuric acid solution and mulled to form a paste.

In the broadest aspect of the present invention, the iron oxides are treated with the sulfuric acid solution for at least a period of time sufficient to achieve thorough mixing of the sulfuric acid solution with the iron oxides. Typically, the treatment lasts from about 1 minute to about 48 hours. In a specific embodiment of the present invention, the treatment lasts from about 3 minutes to about 5 hours, more specifically from about 10 minutes to about 30 minutes.

The treatment of iron oxides with sulfuric acid solution can be conducted under a pressure from about 0.5 atm to about 100 atm. In one specific embodiment of the present invention, it is conducted under ambient pressure. The treatment can be conducted in any suitable atmosphere. Non-limiting examples of the suitable atmosphere include air, other oxygen containing gaseous streams, and inert gaseous streams.

After the iron oxides are treated with sulfuric acid solution, they can be separated from the solution by any suitable separation method. Without intending to limit the scope of the invention, the treated iron oxides can be separated out by filtration, centrifugation, etc.

As a preferred embodiment of the present invention, the treated iron oxides, after being separated from the sulfuric acid solution, are subsequently heated at an elevated temperature. The heating and/or calcining is typically conducted at a temperature ranging from about 1° above the ambient temperature to about 1400° C. for a period of time sufficient to dry or calcine the treated iron oxides completely. Typically, the iron oxides are dried and/or calcined for from about 1 minute to about 100 hours. This heating step can be a simple drying process, a calcination process, or a staged drying and calcination process. The heating is conducted under a pressure typically from about 0.1 atm to about 10 atm. As a non-limiting example, the heating step can be conducted under ambient pressure. The heating step can be conducted under any suitable atmospheres. Non-limiting examples of the suitable atmospheres for the heating step include air, oxygen containing gaseous streams, inert gaseous streams, and vaccum.

In one specific embodiment of the present invention, the iron oxides are treated with a sulfuric acid solution and the treated iron oxides are separated from the solution without subsequent heating. The treated iron oxides can optionally be dried in air at ambient temperature and ambient pressure. In another specific embodiment of the present invention, the iron oxides are dried in air at a temperature between about 30° C. and about 300° C., preferably between about 50° C. and about 300° C., more preferably between about 100° C. and about 300° C., for a period of time ranging from about 1 minute to about 72 hours, preferably from about 2 minutes to about one hour, more preferably from about 10 minutes to about 30 minutes. In a preferred embodiment, the treated iron oxides are subsequently calcined for a period of time from about 1 minute to about 72 hours, preferably from about 15 minutes to about 10 hours, more preferably from about 30 minutes to about 2 hours. In another preferred embodiment, the iron oxides are first dried at a temperature between about 30° C. and about 300° C., preferably between about 120° C. and about 200° C. for a period of time ranging from about 1 minute to about 72 hours, preferably from about 2 minutes to about one hour, more preferably from about 10 minutes to about 30 minutes, and then calcined for a period of time from about 1 minute to about 72 hours, preferably from about 15 minutes to about 10 hours, more preferably from about 30 minutes to about 2 hours.

After the iron oxides are dried and or calcined, a sample of the treated iron oxides is analyzed with a suitable analytical method(s) to determine the chloride content. The post-treatment chloride content is compared with the chloride content measured prior to the treatment.

It has been found that by the operation of the process of the present invention, sulfuric acid treatment, optionally in combination with drying and/or calcination effectively facilitates the removal of the residual chloride present in the iron oxides.

The invention will be illustrated by the following illustrative embodiments which are provided for illustration purpose only and are not intended to limit the scope of the instant invention.

ILLUSTRATIVE EMBODIMENTS

The following illustrative embodiments describe typical techniques of the present invention for reducing chloride content in the regenerated iron oxides and the typical techniques for measuring the chloride contents of the iron oxides. The chloride contents were determined using Kevex Model 770 Energy Dispersive X-Ray Fluorescence Instrument.

Part A: Regenerated Iron Oxide

The ferric oxide used in the present embodiment is a commercial product of regenerated iron oxide produced from hydrochloric acid waste liquid generated from steel pickling. The chloride content of the regenerated iron oxide was about 1400 parts per million by weight of the regenerated iron oxide measured by Kevex Model 770 Energy Dispersive X-Ray Fluorescence Instrument.

600 grams of the regenerated iron oxide were used for each Illustrative Embodiment below. The total amount of the chloride present in the 600 grams of regenerated iron oxide with 1400 parts per million (ppm) of chloride was estimated to be about 0.84 grams or 0.0237 moles based on mathematical calculation.

Part B: Preparation of $H_2SO_4$ Solution

B-1: $H_2SO_4$ Solution of 1:1 Ratio Relative to Cl 1.3 mililiters of concentrated sulfuric acid with specific gravity of 1.84 g/ml were added to 61.7 mililiters of deionized water to make a solution of about 63 mililiters containing approximately 0.0237 moles of $H_2SO_4$, which was equal molar amount of the chloride contained in the 600 grams of regenerated iron oxide from Part A above.

B-2: $H_2SO_4$ Solution of 2:1 Ratio Relative to Chloride 2.6 mililiters of concentrated sulfuric acid with specific gravity of 1.84 g/ml were added to 60.4 mililiters of water to make a solution of about 63 mililiters by volume containing approximately $2 \times 0.0237$ moles of $H_2SO_4$ which was twice the molar amount at the chloride present in the 600 grams of the regenerated ferric oxide from Part A.

Part C: Reduction of Chloride in Ferric Oxide

I. $H_2SO_4$ TREATMENT FOLLOWED BY DRYING
Method I-1: Treatment with $H_2SO_4$, 2:1/Dried at 50° C.

600 grams of the regenerated iron oxide from Part A above were mulled for 15 minutes. During mulling, 63 mililiters of the $H_2SO_4$ solution, prepared from B-2 above, containing a molar amount of $H_2SO_4$ in the $H_2SO_4$ solution of about twice the molar amount of chloride contained in 600 grams of the regenerated iron oxide, were added gradually to the regenerated iron oxide. The wet iron oxide powder was filtered through a #7 mesh screen and then dried for 15 minutes at 50° C. under ambient pressure. A sample of the dried regenerated iron oxide was submitted for chloride analysis. The chloride content of the dried sample was 1200 parts per million by weight of the total iron oxides as shown in TABLE I below.

Method I-2: Treatment with $H_2SO_4$, 2:1/Dried at 120° C.

600 grams of the regenerated iron oxide from Part A above were treated with the same $H_2SO_4$ solution in the same way as Method I-1 above, except that subsequent to the filtration step the treated iron oxide powder was dried at 120° C. at ambient pressure for 15 minutes. The chloride content of the dried sample was 720 ppm as shown in TABLE I below. Method I-3: Treatment with $H_2SO_4$, 1:1/Dried at 170° C.

600 grams of the regenerated iron oxide from Part A were mulled for 15 minutes. During mulling, 63 mililiters of the $H_2SO_4$ solution, prepared from B-1 above, containing a molar amount of $H_2SO_4$ in the $H_2SO_4$ solution about equal to the molar amount of chloride contained in 600 grams of the regenerated iron oxide, were added gradually to the regenerated iron oxide. The wet iron oxide powder was filtered through a #7 mesh screen and then dried for 15 minutes at 170° C. under ambient pressure. A sample of the dried regenerated iron oxide was submitted for chloride analysis. The chloride content of the dried sample was 550 parts per million by weight of the total iron oxides as shown in TABLE I below.

Method I-4: Treatment with $H_2SO_4$, 2:1/Dried at 170° C.

600 grams of the regenerated iron oxide from Part A above were treated with the same $H_2SO_4$ solution in the same way as Method I-2 above, except that subsequent to the filtration step the treated iron oxide powder was dried at 170° C. at ambient pressure. The chloride content of the dried sample was 510 ppm as shown in TABLE I below.

II. $H_2SO_4$ TREATMENT FOLLOWED BY DRYING AND CALCINING

Method C-1: Comparative Embodiment—Calcination without $H_2SO_4$ 600 grams of the regenerated iron oxide from Part A above were mulled for 15 minutes without the addition of any $H_2SO_4$ solution. The mulled iron oxide were then dried for 15 minutes at 170° C. Thirty grams of the dried oxide were calcined in a static kiln under air having one atmosphere pressure for one hour at 825° C. A sample of the calcined iron oxide was submitted for chloride analysis. The resulted chloride content was 810 ppm.

Method C-2: Comparative Embodiment—Treatment with $H_2O$/Calcined 600 grams of the regenerated iron oxide from Part A above were mulled for 15 minutes. During mulling, 63 mililiters of deionized water were gradually added to the regenerated iron oxide. The wet iron oxide powder was filtered through a #7 mesh screen and then dried for 15 minutes at 170° C. Thirty grams of the dried oxide were calcined in a static kiln under air having one atmosphere pressure for one hour at 825° C. A sample of the calcined iron oxide was submitted for chloride analysis. The resulting chloride content was 880 ppm.

Method II-1: Treatment with $H_2SO_4$, 1:1/Dried/Calcined

Thirty grams of the dried oxide from Method I-3 above were calcined in a static kiln under air having one atmosphere pressure for one hour at 825° C. A sample of the calcined iron oxide was submitted for chloride analysis. The chloride content of the resulting sample was 510 ppm as shown in TABLE II below.

Method II-2: Treatment with $H_2SO_4$, 2:1/Dried/Calcined

TABLE I

REGENERATED IRON OXIDE CHLORIDE REDUCTION STUDY I

| Sample | Chloride Reduction Method | Treating Solution | Heating Condition | Chloride Content ppm | Chloride Reduction % |
|---|---|---|---|---|---|
| Untreated Commerical RIO | None | None | None | 1400 | — |
| I-1 | $H_2SO_4$ 2:1 Dried | $H_2SO_4$ 2:1 | 50° C. | 1200 | 14% |
| I-2 | $H_2SO_4$ 2:1 Dried | $H_2SO_4$ 2:1 | 120° C. | 720 | 49% |
| I-3 | $H_2SO_4$ 1:1 Dried | $H_2SO_4$ 1:1 | 170° C. | 550 | 61% |
| I-4 | $H_2SO_4$ 2:1 Dried | $H_2SO_4$ 2:1 | 170° C. | 510 | 64% |

Thirty grams of the dried oxide from Method I-4 above were calcined in a static kiln in air with one atmosphere pressure for one hour at 825° C. A sample of the calcined iron oxide was submitted for chloride analysis. The chloride content of the resulting sample was 390 ppm as shown in TABLE II below.

TABLE II

REGENERATED IRON OXIDE CHLORIDE REDUCTION STUDY II

| Sample | Chloride Reduction Method | Treating Solution | Heating Condition | Chloride Content ppm | Chloride Reduction % |
|---|---|---|---|---|---|
| Untreated Commerical RIO | None | None | None | 1400 | — |
| C-1 | Dried & Calcined | None | 170° C. & 825° C. | 810 | 42% |

TABLE II-continued

| | REGENERATED IRON OXIDE CHLORIDE REDUCTION STUDY II | | | | |
|---|---|---|---|---|---|
| Sample | Chloride Reduction Method | Treating Solution | Heating Condition | Chloride Content ppm | Chloride Reduction % |
| C-2 | $H_2O$ Dried & Calcined | $H_2O$ | 170° C. & 825° C. | 880 | 37% |
| II-1 | $H_2SO_4$ 1:1 Dried & Calcined | $H_2SO_4$ 1:1 | 170° C. & 825° C. | 510 | 64% |
| II-2 | $H_2SO_4$ 2:1 Dried & Calcined | $H_2SO_4$ 2:1 | 170° C. & 825° C. | 390 | 72% |

III. $H_2SO_4$ TREATMENT WITHOUT SUBSEQUENT DRYING/CALCINING

Method C-3: Comparative Embodiment—Treatment with $H_2O$ 600 grams of the regenerated iron oxide from Part A above were mulled for 15 minutes. During mulling, 63 mililiters of the deionized water were gradually added to the regenerated iron oxide. The wet iron oxide powder was filtered through a #7 mesh screen, A sample of this wet regenerated iron oxide was submitted for chloride analysis. The chloride content was 10,200 ppm as shown in TABLE III below.

Method III-1: Treatment with $H_2SO_4$, 2:1 Undried/Uncalcined 600 grams of the regenerated iron oxide from Part A were mulled for 15 minutes. During mulling, 63 mililiters of the $H_2SO_4$ solution, prepared from B-2 above, containing a molar amount of $H_2SO_4$ in the $H_2SO_4$ solution about equal to the molar amount of chloride contained in 600 grams of the regenerated iron oxide, were added gradually to the regenerated iron oxide. The wet iron oxide powder was filtered through a #7 mesh screen. A sample of the wet treated regenerated iron oxide was submitted for chloride analysis. The chloride content of the dried sample was 3,200 parts per million by weight of the total iron oxides as shown in TABLE I below.

TABLE III

| | REGENERATED IRON OXIDE CHLORIDE REDUCTION STUDY III | | | | |
|---|---|---|---|---|---|
| Sample | Chloride Reduction Method | Treating Solution | Heating Condition | Chloride Content ppm | Chloride Reduction % |
| C-3 Damp Control | $H_2O$ Undried & Uncalcined Uncalcined | $H_2O$ | Undried Uncalcined | 10,200 | — |
| III-1 | $H_2SO_4$ 2:1 | $H_2SO_4$ 2:1 | Undried Uncalcined | 3200 | 70% |

The ranges and limitations provided in the instant specification and claims are those which are believed to particularly point out a distinctly claim the instant invention. It is, however, understood that other ranges and limitations that perform substantially the same function in substantially the same manner to obtain the same or substantially the same result are intended to be within the scope of the instant invention as defined by the instant specification and claims.

I claim:

1. A process for removing chloride from a chloride-containing iron oxide, which process comprises the steps of:
   (a) mixing the chloride-containing iron oxide with an aqueous solution comprising a molar amount of $H_2SO_4$ from about 0.5 to about 5 times the molar amount of chloride in the chloride-containing iron oxide to form a mixture; and
   (b) separating the iron oxide from said mixture formed in step (a).

2. The process as described in claim 1, wherein the solution comprising $H_2SO_4$ used in step (a) comprises a molar amount of $H_2SO_4$ of from about 0.5 to about 2.5 times the molar amount of chloride in the chloride-containing iron oxide.

3. The process as described in claim 1, wherein the solution comprising $H_2SO_4$ used in step (a) comprises a molar amount of $H_2SO_4$ of from about 1.8 to about 2.5 times the molar amount of chloride in the chloride-containing iron oxide.

4. The process as described in claim 2, wherein in step (a) the iron oxide is mixed with said solution comprising $H_2SO_4$ for a period of time ranging from about 1 minute to about 48 hours.

5. The process as described in claim 1, wherein the iron oxide separated from step (b) is further heated at a temperature ranging from about 1° C. above ambient temperature to about 1400° C. for a period of time from about 1 minute to about 100 hours.

6. The process as described in claim 1, wherein the iron oxide separated from step (b) is further heated at a temperature ranging from about 50° C. to about 300° C. for a period of time ranging from about 2 minutes to about one hour.

7. The process as described in claim 1, wherein the iron oxide separated from step (b) is first heated at a temperature from about 50° C. to about 300° C. for a period of time ranging from about 1 minute to about 72 hours, and the iron oxide is thereafter heated at a temperature from about 400° C. to about 1400° C. at a pressure from about 0.1 atm to about 10 atm for a period of time ranging from about 1 minute to about 72 hours.

8. A process for removing chloride from a chloride-containing iron oxide, which process comprises the steps of:
   (a) mixing the chloride-containing iron oxide with an aqueous solution comprising a molar amount of $H_2SO_4$ of from about 0.5 to about 5 times the molar amount of chloride present in the chloride-containing iron oxide for a period of time from about 1 minute to about 48 hours to form a mixture;

(b) separating the iron oxide from said mixture formed in step (a); and (c) heating the separated iron oxide from step (b) at a temperature from about 1° C. above ambient temperature to about 14000° C. at a pressure from about 0.1 atm to about 10 atm for a period of time from about 1 minute to about 100 hours.

9. The process as claimed in claim 8, wherein the solution comprising $H_2SO_4$ in step (a) comprises from a molar amount of $H_2SO_4$ of from about 0.5 to about 2.5 times the molar amount of chloride present in the chloride-containing iron oxide prior to being mixed with said solution comprising $H_2SO_4$; wherein in step (a) the iron oxide is mixed with said solution comprising $H_2SO_4$ for a period of time ranging from about 3 minutes to about 5 hours.

10. The process as claimed in claim 8, wherein in step (c) the iron oxide is first heated at a temperature from about 100° C. to about 300° C. at a pressure from about 0.1 atm to about 10 atm for a period of time ranging from about 1 minute to about 72 hours and then heated to a temperature from about 400° C. to about 1400° C. at a pressure from about 0.1 atm to about 10 atm for a period of time from about 1 minute to about 72 hours.

11. A process for removing chloride from a regenerated iron oxide comprising from about 800 to about 5000 ppm by weight of chloride, wherein said regenerated iron oxide is produced from a hydrochloric acid waste liquid generated from steel pickling, which process comprises the steps of:

(a) mixing the regenerated iron oxide with an aqueous solution comprising a molar amount of $H_2SO_4$ of from about 0.5 to about 5 times the molar amount of chloride in the regenerated iron oxide for a period of time ranging from about 1 minute to about 48 hours at a pressure from about 0.5 atm to about 100 atm to form a mixture;

(b) separating the iron oxide from said mixture formed in step (a); and (c) heating the separated iron oxide from (b) at a temperature ranging from about 100° C. to about 1400° C. at a pressure from about 0.1 atm to about 10 atm for a period of time from about 1 minute to about 72 hours.

12. The process as described in claim 11, wherein in step (c) the iron oxide is first heated at a temperature ranging from about 100° C. to about 300° C. for a period of time ranging from about 1 minute to about 72 hours, and the iron oxide is thereafter heated at a temperature from about 400° C. to about 1400° C. at a pressure from about 0.1 atm to about 10 atm for a period of time from about 1 minute to about 72 hours.

13. The process as described in claim 11, wherein in step (a) the iron oxide is treated with an aqueous solution comprising a molar amount of $H_2SO_4$ of from about 0.5 to about 2.5 times the molar amount of chloride in the regenerated iron oxide.

14. The process as described in claim 11, wherein, in step (c) the iron oxide is heated at about 700° C. to about 1000° C. at a pressure from about 0.1 atm to about 10 atm for a period of time ranging from about 30 minutes to about 1.5 hours.

15. The process as described in claim 14, wherein the heating in step (c) is conducted in an oxygen-containing gaseous stream.

16. The process as described in claim 15, wherein the mixing in step (a) is conducted in an oxygen-containing gaseous stream.

17. The process as described in claim 14, wherein the heating in step (c) is conducted in air under ambient pressure.

18. The process as described in claim 15, wherein the mixing in step (a) is conducted in air under ambient pressure.

19. The process as described in claim 18, wherein the aqueous solution comprising $H_2SO_4$ used in step (a) comprises a molar amount of $H_2SO_4$ of from about 1.8 to about 2.5 times the molar amount of chloride in the regenerated iron oxide.

* * * * *